United States Patent
Jeong

(10) Patent No.: US 12,313,952 B2
(45) Date of Patent: May 27, 2025

(54) BEAM STEERING APPARATUS, METHOD OF DRIVING THE BEAM STEERING APPARATUS, AND LiDAR SYSTEM INCLUDING THE BEAM STEERING APPARATUS

(71) Applicant: SAMSUNG ELECTRONICS CO., LTD., Suwon-si (KR)

(72) Inventor: Byunggil Jeong, Anyang-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1115 days.

(21) Appl. No.: 17/144,445

(22) Filed: Jan. 8, 2021

(65) Prior Publication Data

US 2021/0132464 A1 May 6, 2021

Related U.S. Application Data

(63) Continuation of application No. 15/800,328, filed on Nov. 1, 2017, now Pat. No. 10,901,292.

(30) Foreign Application Priority Data

Jun. 22, 2017 (KR) .................. 10-2017-0079215

(51) Int. Cl.
   *G02F 1/29* (2006.01)
   *G01S 7/481* (2006.01)
   *G01S 17/42* (2006.01)

(52) U.S. Cl.
   CPC ............ *G02F 1/292* (2013.01); *G01S 7/4814* (2013.01); *G01S 7/4817* (2013.01); *G01S 17/42* (2013.01); *G02F 2201/34* (2013.01)

(58) Field of Classification Search
   CPC .... G01S 7/4814; G01S 7/4815; G01S 7/4817; G01S 17/26; G01S 17/42; G02F 1/292; G02F 2201/34
   See application file for complete search history.

(56) References Cited

U.S. PATENT DOCUMENTS 5,253,033 A    10/1993  Lipchak et al.
5,552,893 A *   9/1996  Akasu ............... G01C 3/00
                                                356/5.01
(Continued)

FOREIGN PATENT DOCUMENTS

CN    201173972 Y    12/2008
CN    102564302 A     7/2012
(Continued)

OTHER PUBLICATIONS

Communication dated Nov. 12, 2021 issued by the Korean Intellectual Property Office in counterpart Korean Application No. 10-2017-0079215.

(Continued)

*Primary Examiner* — Luke D Ratcliffe
*Assistant Examiner* — Benjamin Richard Hebert
(74) *Attorney, Agent, or Firm* — Sughrue Mion, PLLC

(57) ABSTRACT

Provided are a beam steering apparatus, a method of driving the beam steering apparatus, and a light detection and ranging (LiDAR) system including the beam steering apparatus. The beam steering apparatus includes: a phase modulation device configured to modulate a phase of incident light and emit at least first emitted light and second emitted light; and a beam reflection device configured to reflect, to an object, at least one from among the first emitted light and the second emitted light. The phase modulation device includes a plurality of channels configured to independently modulate the phase of the incident light, and a binary phase profile is formed when one of first and second phase values $\varphi 1$ and $\varphi 2$ is applied to each of the plurality of channels.

16 Claims, 13 Drawing Sheets

(56) References Cited

U.S. PATENT DOCUMENTS

| | | |
|---|---|---|
| 6,515,622 B1 | 2/2003 | Izadpanah et al. |
| 7,333,055 B2 | 2/2008 | Baharav et al. |
| 8,643,849 B2 | 2/2014 | Tao et al. |
| 10,197,676 B2* | 2/2019 | Slobodyanyuk ... G02B 26/0808 |
| 2001/0050787 A1* | 12/2001 | Crossland ............... G02F 1/292 |
| | | 359/9 |
| 2005/0007668 A1* | 1/2005 | Serati ................. G02B 26/0833 |
| | | 359/618 |
| 2010/0208234 A1* | 8/2010 | Kaehler .................. G01S 17/42 |
| | | 356/5.01 |
| 2011/0058167 A1 | 3/2011 | Knox et al. |
| 2014/0313560 A1 | 10/2014 | Shaddock |
| 2015/0198701 A1 | 7/2015 | Dolgin |
| 2015/0346340 A1 | 12/2015 | Yaacobi et al. |
| 2016/0047895 A1 | 2/2016 | Dussan |
| 2016/0161600 A1 | 6/2016 | Eldada et al. |
| 2017/0323429 A1 | 11/2017 | Godbaz et al. |
| 2017/0357142 A1* | 12/2017 | Spector .................. G02B 27/30 |
| 2018/0074382 A1* | 3/2018 | Lee ........................ G02F 1/0316 |
| 2018/0231640 A1 | 8/2018 | Han et al. |
| 2018/0284286 A1 | 10/2018 | Eichenholz et al. |
| 2018/0292309 A1 | 10/2018 | Prasad |
| 2018/0373129 A1 | 12/2018 | Pertierra et al. |
| 2019/0107711 A1 | 4/2019 | Blanche et al. |
| 2019/0391243 A1 | 12/2019 | Nicolaescu |

FOREIGN PATENT DOCUMENTS

| | | |
|---|---|---|
| CN | 104145437 A | 11/2014 |
| EP | 1 050 775 A1 | 11/2000 |
| GB | 2349231 A | 10/2000 |
| KR | 10-1399971 B1 | 6/2014 |

OTHER PUBLICATIONS

Engstrom, et al., "Beam steering by combining two binary-phase-modulated FLC SLMs", Nov. 2003, Proceedings of SPIE, vol. 5181, Wave Optics and Photonic Devices for Optical information Processing II, 13 pages total, XP 055484942.

Communication issued Jun. 28, 2018, issued by the European Patent Office in counterpart European Patent Application No. 17201663.6.

Communication dated Feb. 28, 2023, issued by the China National Intellectual Property Administration in counterpart Chinese Application No. 201711337028.4.

* cited by examiner

BEAM STEERING APPARATUS, METHOD OF DRIVING THE BEAM STEERING APPARATUS, AND LiDAR SYSTEM INCLUDING THE BEAM STEERING APPARATUS

CROSS-REFERENCE TO RELATED APPLICATIONS

This is a Continuation Application of U.S. patent application Ser. No. 15/800,328 filed on Nov. 1, 2017 (now U.S. Pat. No. 10,901,292), which claims priority from Korean Patent Application No. 10-2017-0079215, filed on Jun. 22, 2017, in the Korean Intellectual Property Office, the disclosures of which are incorporated herein by reference in their entireties.

BACKGROUND

1. Field

Methods and apparatuses consistent with exemplary embodiments relate to beam steering apparatuses, methods of driving the beam steering apparatuses, and light detection and ranging (LiDAR) systems including the beam steering apparatuses.

2. Description of the Related Art

An optical phased array (OPA) is a light modulator method that may be used in a light detection and ranging (LiDAR) system for obtaining information of a surrounding environment by scanning a laser beam. An OPA may steer a light, emitted from a plurality of channels, by a predetermined angle by inducing a predetermined phase difference between adjacent channels.

In order to effectively use an OPA, each channel should to have phase modulation ranging from $0\pi$ to $2\pi$. Otherwise, efficiency of the beam steering may be reduced and a signal-to-noise (SNR) ratio may be reduced, thereby reducing the efficiency of the overall LiDAR system.

SUMMARY

One or more exemplary embodiments may provide beam steering apparatuses, methods of driving the beam steering apparatuses, and LiDAR systems including the beam steering apparatuses.

Additional exemplary aspects will be set forth in part in the description which follows and, in part, will be apparent from the description, or may be learned by practice of the presented exemplary embodiments.

According to an aspect of an exemplary embodiment, a beam steering apparatus includes: a phase modulation device configured to modulate a phase of incident light and emit at least first emitted light and second emitted light; and a beam reflection device configured to reflect, to an object, at least one from among the first emitted light and the second emitted light, wherein the phase modulation device includes a plurality of channels configured to independently modulate the phase of the light incident thereon, and a binary phase profile is formed when one of among a first phase value $\varphi 1$ and a second phase value $\varphi 2$ is applied to each of the plurality of channels.

The first emitted light may be emitted from the phase modulation device to the object and the second emitted light may be reflected by the beam reflection device to the object.

A scan area of the first emitted light and a scan area of the second emitted light may be controlled to be the same or may be controlled to be located adjacent to each other by adjusting a reflection angle of the second emitted light.

The phase modulation device may include: a phase modulator including a plurality of channels; a signal input unit configured to apply an input signal for phase modulation to each of the plurality of channels; a binary setter configured to set the binary phase profile by quasi-periodically arranging the first and second phase values $\varphi 1$ and $\varphi 2$ by a number of the plurality of channels and assigning the first and second phase values $\varphi 1$ and $\varphi 2$ in an order in which the plurality of channels are arranged; and a controller configured to control the signal input unit according to the binary phase profile.

The binary setter may be further configured to repeatedly perform processes of setting the first phase value $\varphi 1$ for one or more first adjacent channels of the plurality of channels and setting the second phase value $\varphi 2$ for one or more second adjacent channels of the plurality of channels, wherein optical performance of the phase modulation device is adjustable according to an average value of cycles in which an arrangement pattern of the first and second phase values $\varphi 1$ and $\varphi 2$ is repeated.

The binary setter may enable the phase modulator to steer the incident light by an angle $\theta$ according to $$\sin \theta = \frac{\lambda}{<T_k>}$$

where $\lambda$ is a wavelength of the incident light, $T_k$ is a $k^{th}$ cycle in which the arrangement pattern of the first and second phase values $\varphi 1$ and $\varphi 2$ is repeated, and $<T_k>$ is an average value of the cycles.

The binary setter may be further configured to set a full phase profile using an entire phase value range from $0\pi$ to $2\pi$ to achieve a desired optical performance and to correct each phase value of the full phase profile to one of the first and second phase values $\varphi 1$ and $\varphi 2$.

The binary setter may be further configured to correct phase values falling within a set range to the first phase value $\varphi 1$ and correct phase values outside the set range to the second phase value $\varphi 2$. A difference between the first phase value $\varphi 1$ and the second phase value $\varphi 2$ may be $\pi$ and a width of the set range may be $\pi$.

According to an aspect of another exemplary embodiment, a method of driving a beam steering apparatus including a phase modulation device and a beam reflection device includes: selecting first and second phase values $\varphi 1$ and $\varphi 2$ to be used as phase values for a plurality of channels; setting a binary phase profile by quasi-periodically setting first and second phase values $\varphi 1$ and $\varphi 2$ for a plurality of channels of the phase modulation device; emitting first emitted light and second emitted light by driving the phase modulation device according to the set binary phase profile; and reflecting at least one of the first emitted light and the second emitted light to the object.

The first emitted light may be emitted from the phase modulation device to the object and the second emitted light may be reflected by the beam reflection device to the object.

The beam reflection device may be further configured to cause a scan area of the first emitted light and a scan area of the second emitted light to be same by adjusting a reflection angle of the second emitted light. The first emitted light and the second emitted light may be scanned over the object by overlapping each other or are alternately scanned over the object.

The beam reflection device may be further configured to cause a scan area of the first emitted light and a scan area of the second emitted light to be located adjacent to each other by adjusting a reflection angle of the second emitted light.

The setting of the binary phase profile may include repeatedly performing processes of setting the first phase value φ1 for one or more first adjacent channels and setting the second phase value φ2 for one or more second adjacent channels, wherein an optical performance of the phase modulation device is adjusted according to an average value of cycles in which an arrangement pattern of the first and second phase values φ1 and φ2 is repeated.

The setting of the binary phase profile may include enabling a phase modulator to steer the incident light by an angle θ according to $$\sin\theta = \frac{\lambda}{<T_k>}$$

where λ is a wavelength of the incident light, $T_k$ is a $k^{th}$ cycle in which the arrangement pattern of the first and second phase values φ1 and φ2 is repeated, and $<T_k>$ is an average value of the cycles.

The setting of the binary phase profile may include: setting a full phase profile using an entire phase value range from 0 π to 2 π to achieve a desired optical performance; and correcting phase values of full phase profile to one of the first and second phase values φ1 and φ2.

Phase values within a set range may be corrected to the first phase value φ1 and phase values outside the set range may be corrected to the second phase value φ2. A difference between the first phase value φ1 and the second phase value φ2 may be π and a width of the set range may be n.

According to an aspect of another exemplary embodiment, a light detection and ranging (LiDAR) system includes: a light source; a beam steering apparatus configured to steer light from the light source to an object and a phase modulation device configured to modulate a phase of incident light and emit at least first emitted light and second emitted light and a beam reflection device configured to reflect at least one of the first emitted light and the second emitted light to the object; and a sensor unit configured to receive light reflected from the object, wherein the phase modulation device includes a plurality of channels configured to independently modulate the phase of the light incident there on, and a binary phase profile is formed when one of the first and second phase values φ1 and φ2 is applied to each of the plurality of channels.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
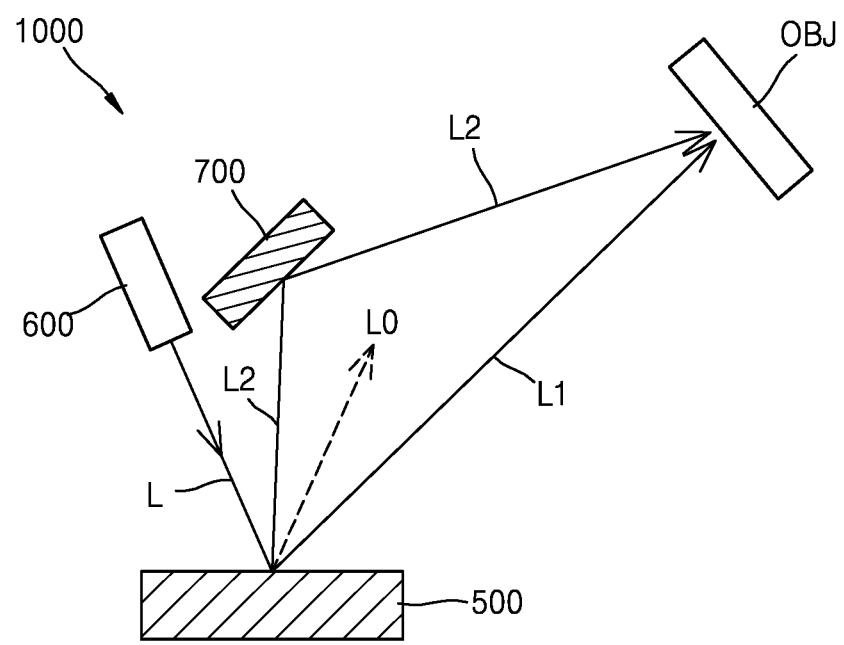
FIG. 1 is a view of a beam steering apparatus according to an exemplary embodiment.

Reference will now be made in detail to embodiments, examples of which are illustrated in the accompanying drawings. In the drawings, like reference numerals denote like elements and sizes of elements may be exaggerated for clarity and convenience. In this regard, the present exemplary embodiments may have different forms and should not be construed as being limited to the descriptions set forth herein.

It will be understood that when a component is referred to as being "on" another component, the component may be directly on the other component or intervening components may be present thereon.

As used herein, the singular forms "a", "an", and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components.

The use of the term "the" and similar referents in the context of describing the present disclosure are to be construed to cover both the singular and the plural.

Also, the steps of all methods described herein may be performed in any suitable order unless otherwise indicated herein or otherwise clearly contradicted by context. The present disclosure is not limited to the described order of the steps. The use of any and all examples, or exemplary language (e.g., "such as") provided herein, is intended merely to better describe the present disclosure and does not pose a limitation on the scope of the present disclosure unless otherwise claimed.

Expressions such as "at least one of", when preceding a list of elements, modify the entire list of elements and do not modify the individual elements of the list.

Figure 2:
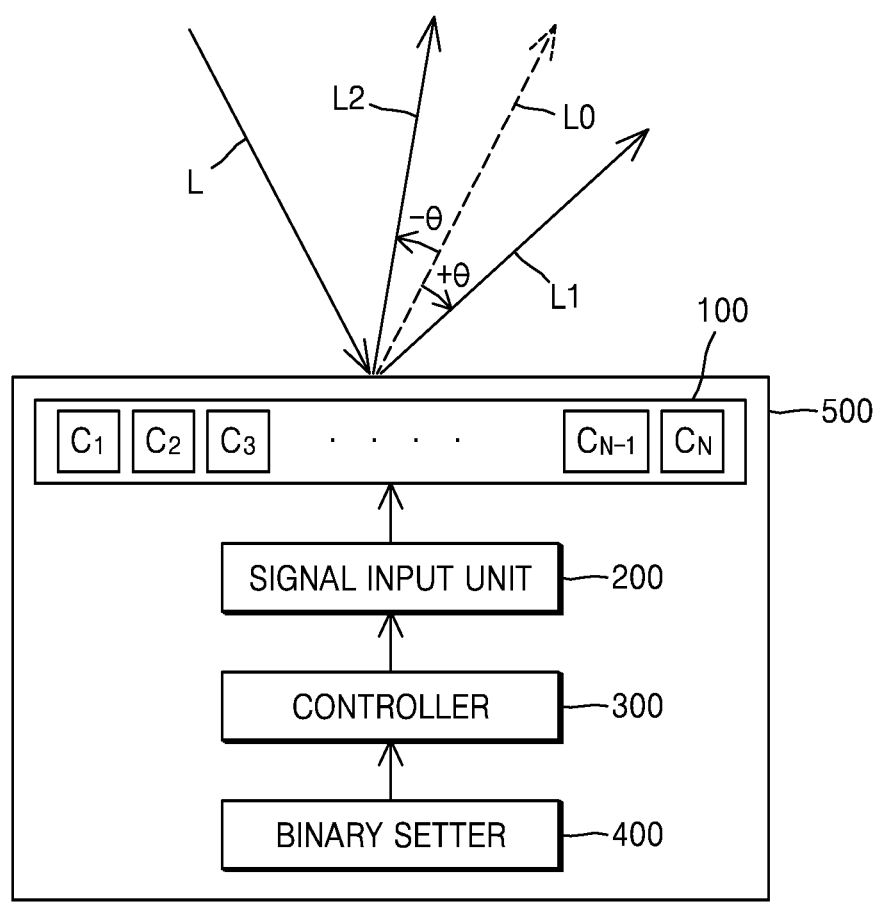
FIG. 2 is an enlarged view of a phase modulation device of FIG. 1.

FIG. 1 is a view of a beam steering apparatus 1000 according to an exemplary embodiment. FIG. 2 is an enlarged view of a phase modulation device 500 of FIG. 1.

Referring to FIG. 1, the beam steering apparatus 1000 may include the phase modulation device 500 and a beam reflection device 700. The phase modulation device 500 may steer emitted light, e.g., first emitted light L1 and second emitted light L2, in different directions by changing a phase of incident light L emitted from a light source 600. The first emitted light L1 may be directly emitted toward an object OBJ and the second emitted light L2 may be emitted in a direction such that it is reflected by the beam reflection device 700 toward the object OBJ.

The light source 600 may emit light having a wavelength band suitable to analyze a position and a shape of the object OBJ. Examples of the light source 600 may include, but are not limited to, a laser diode (LD), a light-emitting diode (LED), and a super luminescent diode (SLD) for emitting light having an infrared wavelength. The light source 600 may emit light in different wavelength bands. The light source 600 may emit pulsed light or continuous light.

The phase modulation device 500 steers the emitted light, e.g., the first emitted light L1 and second emitted light L2, by modulating a phase of the incident light L emitted from the light source 600. The phase modulation device 500 may steer the emitted light, e.g., the first emitted light L1 and the second emitted light L2, by using a binary phased array (BPA) method as described below in which a predetermined phase difference is induced between light emitted from adjacent channels. This is in contrast to an optical phased array (OPA) method in which an emitted beam is steered based on interference between light output from channels by a predetermined angle.

Referring to FIG. 2, the phase modulation device 500 may include a phase modulator 100 including a plurality of channels $C_1$ through $C_N$ configured to modulate a phase of the incident light L, a signal input unit 200 configured to apply an input signal for phase modulation to each of the plurality of channels $C_1$ through $C_N$, a binary setter 400 configured to set a binary phase profile by using two phase values, and a controller 300 configured to control the signal input unit 200 according to the binary phase profile.

The phase modulator 100 includes the plurality of channels $C_1$ through $C_N$ configured to independently modulate a phase of light incident thereon. The phase modulator 100 may include an active layer, whose optical property varies according to an applied signal, and a plurality of nano-structures located adjacent to the active layer. The plurality of nano-structures may form the plurality of channels $C_1$ through $C_N$. The channels $C_1$ through $C_N$ may, respectively, correspond to the one or more nano-structures. Alternatively, the phase modulator 100 may include a plurality of waveguides whose optical properties vary according to an applied signal. The plurality of waveguides may form the plurality of channels $C_1$ through $C_N$. The channels $C_1$ through $C_N$ may respectively correspond to the one or more waveguides. A more detailed structure of the phase modulator 100 will be explained below in detail with reference to FIGS. 2 through 4.

Each of the plurality of channels $C_1$ through $C_N$ modulates a phase of the incident light L according to an applied signal.

The input signal from the signal input unit 200 is determined according to the detailed configuration of the phase modulator 100. For example, they type of input signal may be determined based on the materials of the active layer and the nano-structures of the phase modulator 100. When the phase modulator 100 includes a material whose optical property varies according to an electrical signal, the signal input unit 200 may be configured to apply an electrical signal, for example, a voltage, to the phase modulator 100.

The binary setter 400 sets a phase to be modulated by the channels $C_1$ through $C_N$ in order to the achieve desired performance of the phase modulator 100. The binary setter 400 may set a binary phase profile to achieve desired optical performance by adjusting a rule for assigning two phase values, i.e., first and second phase values φ1 and φ2, to each of the channels $C_1$ through $C_N$ by using the first and second phase values φ1 and φ2. For example, a method of quasi-periodically arranging the first and second phase values φ1 and φ2 by the number of the plurality of channels $C_1$ through $C_N$ and assigning the first and second phase values φ1 and φ2 in an order in which the plurality of channels $C_1$ through $C_N$ are arranged may be used. When the first and second phase values φ1 and φ2 are quasi-periodically arranged, it means that assuming that the first and second phase values φ1 and φ2 are repeated in predetermined cycles, the two phase vales φ1 and φ2 are arranged so that all of a first cycle, a second cycle, . . . , and a $k^{th}$ cycle are the same, some of the cycles are the same and others are different, or all of the cycles are different.

In the present exemplary embodiment, since driving is performed according to a binary phase profile using only the first and second phase values φ1 and φ2, configurations of the phase modulator 100 and the signal input unit 200 may be simplified. The first and second phase values φ1 and φ2 may be determined to be values easily obtained by the channels $C_1$ through $C_N$, for example, values less than a phase limit value.

An intensity indicating desired optical performance when only the first and second phase values φ1 and φ2 are used as above may be less than that when phase values obtained by the channels $C_1$ through $C_N$ of the phase modulator 100 are set to various values ranging from 0 π to 2 π. However, when a channel is actually driven, due to a phase limitation, a phase modulation value may not be further increased even when an input signal is increased, and thus a process of correcting a desired phase of the channel may have to be performed. In the present embodiment, since two phase values from among phase values that may be obtained by the channels $C_1$ through $C_N$ are used and optical performance may be adjusted by using an arrangement rule for the two phase values, simple driving may be performed without correcting a phase. A detailed method of setting the binary phase profile will be explained below with reference to FIGS. 6 through 10.

The controller 300 may control the signal input unit 200 to independently control the channels $C_1$ through $C_N$ according to the binary phase profile set by the binary setter 400.

Figure 3:
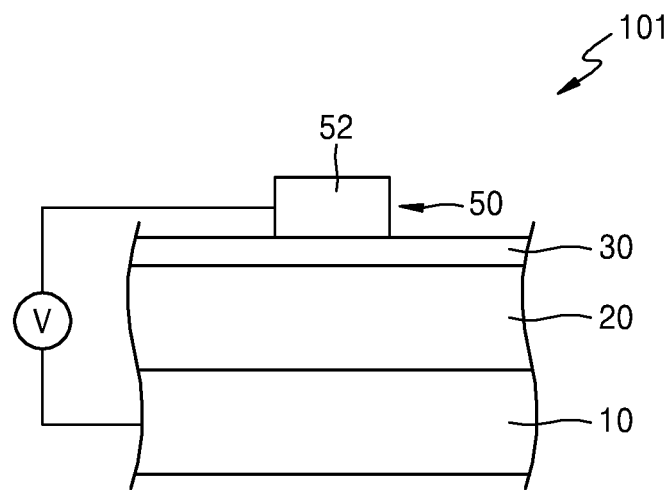
FIG. 3 is a cross-sectional view illustrating a configuration of a phase modulator applicable to the phase modulation device of FIG. 2.
Figure 4:
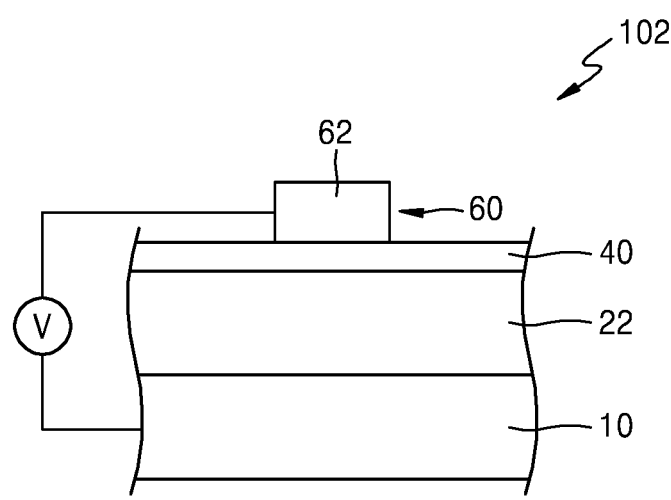
FIG. 4 is a cross-sectional view illustrating a configuration of another phase modulator applicable to the phase modulation device of FIG. 2.

FIGS. 3 and 4 are views illustrating configurations of phase modulators 101 and 102 applicable to the phase modulation device 500. In FIGS. 3 and 4, the phase modulators 101 and 102 include nano-structures each having a meta-surface.

Referring to FIG. 3, the phase modulator 101 includes an active layer 20, a nano-array layer 50, in which conductive nano-structures 52 are arrayed, and an electrode layer 10 for applying a signal to the active layer 20. The active layer 20 may be formed of a material whose optical property varies according to an applied signal. The active layer 20 may be formed of a material whose dielectric constant varies according to, for example, application of an electric field. The nano-array layer 50 includes a plurality of the nano-structures 52, though only a single nano-structure 52, used for forming a single channel, is illustrated in FIG. 3. An insulating layer 30 may be disposed between the nano-array layer 50 and the active layer 20.

The nano-structures 52 may have a sub-wavelength dimension. The term "sub-wavelength dimension" used herein refers to a dimension smaller than an operating wavelength of the phase modulator 101, that is, a wavelength of incident light $L_i$ to be modulated. At least one of the dimensions of the nano-structures 52, for example, a thickness, a horizontal length, and a vertical length, may be a sub-wavelength dimension.

A conductive material included in the nano-structures 52 may be a metal material having a high conductivity in which surface plasmon excitation may occur. For example, the conductive material may be at least one selected from among copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), platinum (Pt), and gold (Au), or an alloy including any one of the above materials. Alternatively, the conductive material may be a two-dimensional (2D) material having a high conductivity such as graphene, or a conductive oxide.

The active layer 20 may be formed of a material whose optical property varies according to application of an external signal. The external signal may be an electrical signal. The active layer 20 may be formed of a transparent conductive oxide (TCO) such as indium tin oxide (ITO), indium zinc oxide (IZO), aluminum zinc oxide (AZO), or gallium zinc oxide (GZO). Alternately, the active layer 20 may be formed of a transition metal nitride such as TiN, ZrN, HfN, or TaN. Alternatively, the active layer 20 may be formed of an electro-optic material whose effective dielectric constant is changed when an electrical signal is applied thereto, for example, $LiNbO_3$, $LiTaO_3$, potassium tantalate niobate (KTN), or lead zirconate titanate (PZT), or any of various polymer materials having electro-optic properties.

The electrode layer 10 may be formed of any of various conductive materials. The electrode layer 10 may include a metal material, for example, at least one selected from among Cu, Al, Ni, Fe, Co, Zn, Ti, Ru, Rh, Pd, Pt, Ag, Os, Ir, Pt, and Au. When the electrode layer 10 is formed of a metal material, the electrode layer 10 may not only apply a voltage but may also reflect light. The electrode layer 10 may be formed of a TCO such as ITO, IZO, AZO, or GZO.

The nano-structures 52 may modulate a phase of light having a specific wavelength due to surface plasmon resonance occurring at a boundary between a metal material and a dielectric material, and an output phase value is related to the specific shape of the nano-structures 52. Also, the output phase value may be adjusted by changing an optical property of the active layer 20 by application of a voltage between the nano-structures 52 and the electrode layer 10.

Referring to FIG. 4, the phase modulator 102 includes an active layer 22, a nano-array layer 60 in which dielectric nano-structures 62 are arrayed, and the electrode layer 10 for applying a signal to the active layer 22. The active layer 22 may be formed of a material whose optical property varies according to application of a signal, for example, a material whose dielectric constant varies according to an electric field applied thereto. The nano-array layer 60 includes a plurality of the nano-structures 62, though only a single nano-structure 62, for forming a single channel, is illustrated in FIG. 4. A conductive layer 40 may be disposed between the nano-array layer 60 and the active layer 22.

The active layer 22 may be formed of an electro-optic material whose effective dielectric constant is changed by application of an electric signal to change a refractive index of the material of the active layer 22. Accordingly, the active layer 22 may be formed of an electro-optic material such as $LiNbO_3$, $LiTaO_3$ KTN, or PZT, or any of various polymer materials having electro-optic properties.

The electrode layer 10 may be formed of any of various conductive materials. The electrode layer 10 may include a metal material, for example, at least one selected from among Cu, Al, Ni, Fe, Co, Zn, Ti, Ru, Rh, Pd, Pt, Ag, Os, Ir, Pt, and Au. When the electrode layer 10 is formed of a metal material, the electrode layer 10 may not only apply a voltage but also reflect light. The electrode layer 10 may be formed of a TCO such as ITO, IZO, AZO, or GZO.

The nano-structures 62 may have a sub-wavelength dimension. The nano-structures 62 may be formed of a dielectric material and may modulate a phase of light having a specific wavelength by using Mie resonance due to displacement current. To this end, the nano-structures 62 may be formed of a dielectric material having a refractive index that is greater than that of the active layer 22, and may be formed of a material having a refractive index greater than a largest value of a range in which a refractive index of the active layer 22 varies according to an applied voltage. A phase value output by the nano-structures 62 is related to the specific shape of the nano-structures 62. Also, the output phase value of the nano-structures 62 may be adjusted by changing an optical property of the active layer 10 by application of a voltage between the conductive layer 40 and the electrode layer 10.

Figure 5:
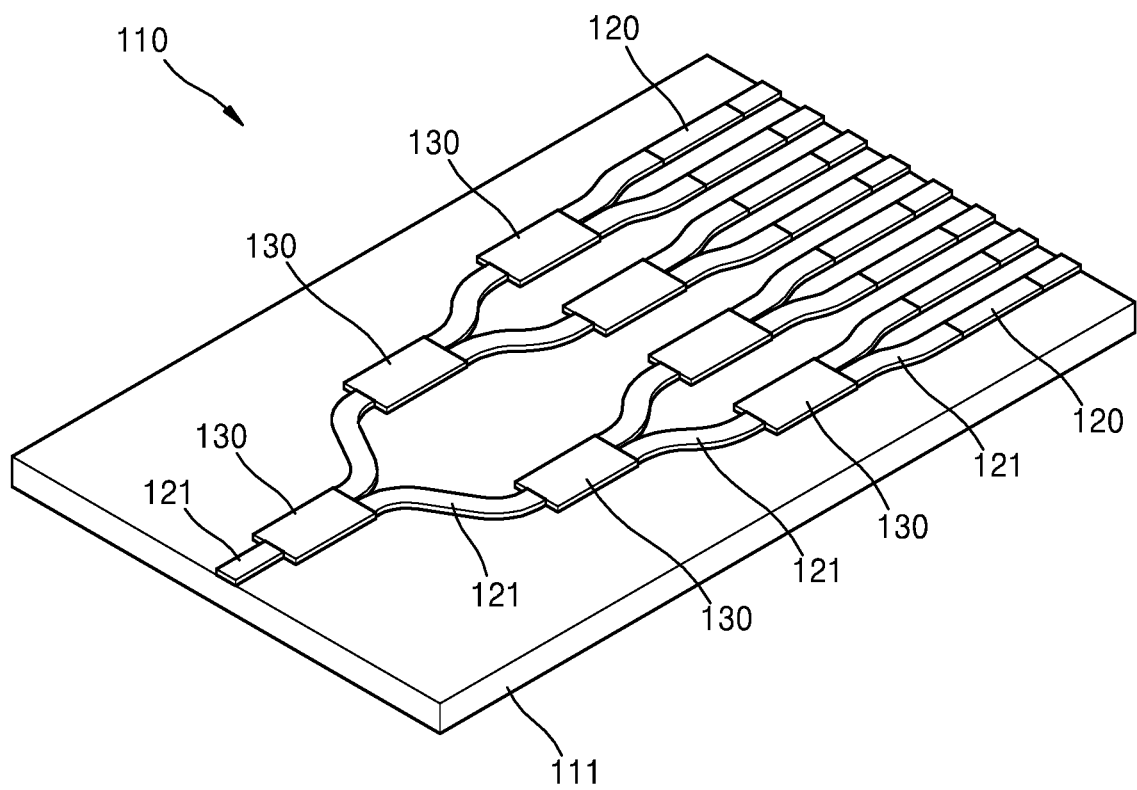
FIG. 5 is a perspective view illustrating a configuration of another phase modulator applicable to the phase modulation device of FIG. 2.

A phase modulator 110 manufactured by using silicon photonics may be used in the phase modulation device 500, as shown in FIG. 5.

Referring to FIG. 5, the phase modulator 110 may include a plurality of waveguides 121, a plurality of beam splitters 130, and a plurality of modulation units 120 provided on a substrate 111. One waveguide 121 in which light travels may be divided into the plurality of waveguides 121 by the beam splitters 130. In FIG. 5, one waveguide 121, on which external light is incident, is divided into eight waveguides 121 by seven beam splitters 130. The modulation units 120 are provided on the waveguides 121 divided by the beam splitters 130, and may each, independently, change a phase of a laser beam passing through the waveguide 121 when an electrical signal is applied.

Figure 6:
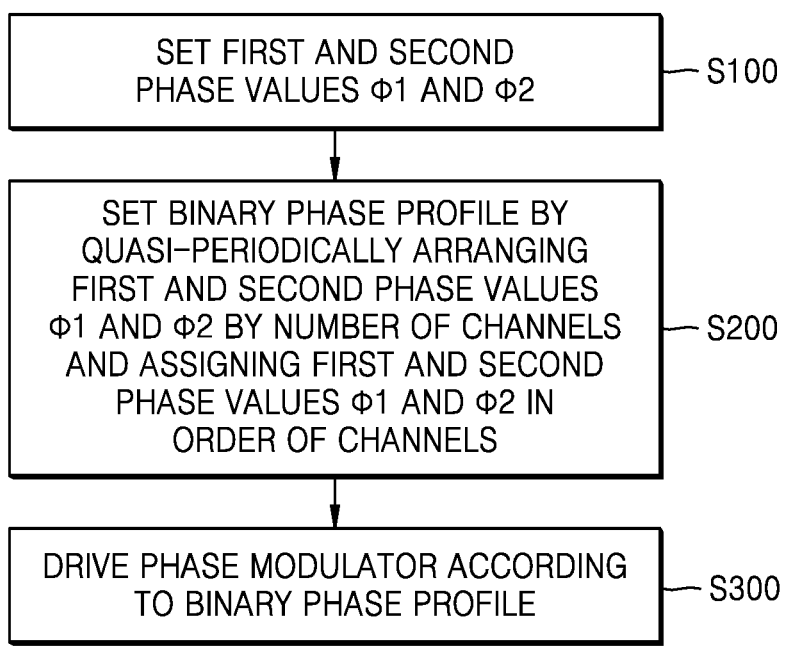
FIG. 6 is a flowchart of a method of driving the phase modulation device according to an exemplary embodiment.

FIG. 6 is a flowchart of a method of driving the phase modulation device 500 according to an exemplary embodiment.

Referring to FIG. 6, in operation S100, two phase values are selected, i.e., the first and second phase values φ1 and φ2, to be used as phase values of the plurality of channels $C_1$ through $C_N$ provided in the phase modulator 100. The first and second phase values φ1 and φ2 may be obtained by each of the channels $C_1$ through $C_N$ provided in the phase modulator 100 and may range from 0 π to 2 π. Considering that there is a phase limitation, the first and second phase values φ1 and φ2 may be selected to be less than a phase limit value of each of the channels $C_1$ through $C_N$. A difference (|φ1−φ2|) between the first and second phase values φ1 and φ2 may be π. For example, φ1, and φ1+π may be selected as the two phase values. In detail, the two phase values may be 0 and π.

Next, in operation S200, in order to set a binary phase profile, the selected first and second phase values φ1 and φ2 may be quasi-periodically arranged by the number of the channels $C_1$ through $C_N$ of the phase modulator 100 and may be assigned in an order in which the plurality of channels $C_1$ through $C_N$ are arranged. When the first and second phase values φ1 and φ2 are quasi-periodically arranged, it means that cycles in which the first and second phase values φ1 and φ2 are repeated are not all the same. Next, in operation S300, the phase modulator 100 is driven according to the set binary phase profile.

Figure 7A:
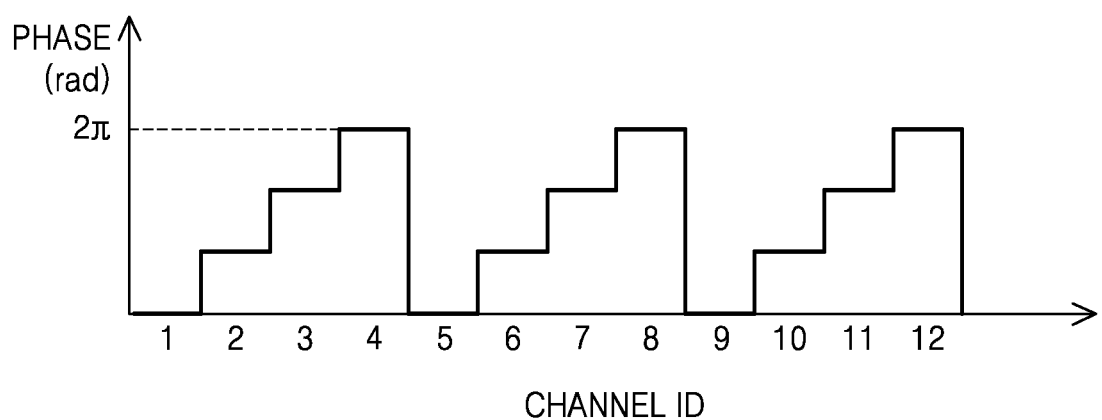
FIG. 7A is a graph showing a full phase profile of an existing optical phased array (OPA) method.
Figure 7B:
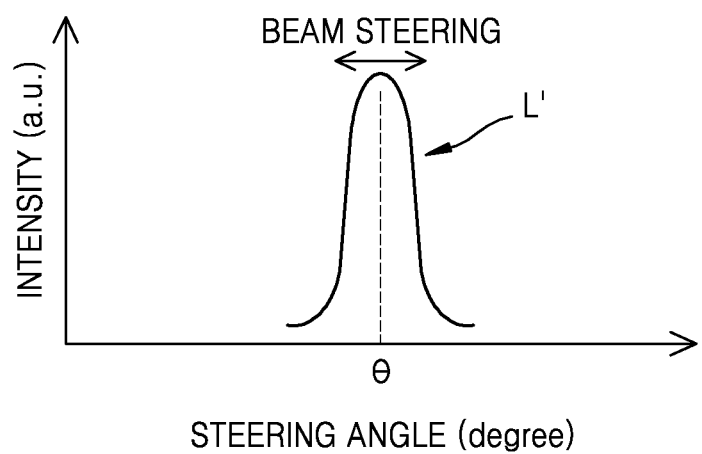
FIG. 7B is a graph showing emitted light steered according to the full phase profile of FIG. 7A.

FIG. 7A is a graph showing a full phase profile in an existing OPA method. FIG. 7B is a graph showing emitted light L' steered according to the full phase profile of FIG. 7A.

Referring to FIG. 7A, in an OPA method, a predetermined full phase profile is formed by inducing a predetermined phase difference between adjacent channels of a phase modulator. Due to the full phase profile, the light L' emitted from the phase modulator is steered by a predetermined angle θ as shown in FIG. 7B.

In this case, the steering angle θ may be defined by Equation 1.

$$\sin\theta = \frac{\Delta\phi}{2\pi}\frac{\lambda}{d} \quad (1)$$

where Δφ is a phase difference between adjacent channels, λ is a wavelength of incident light, and d is a width of each channel.

Figure 8A:
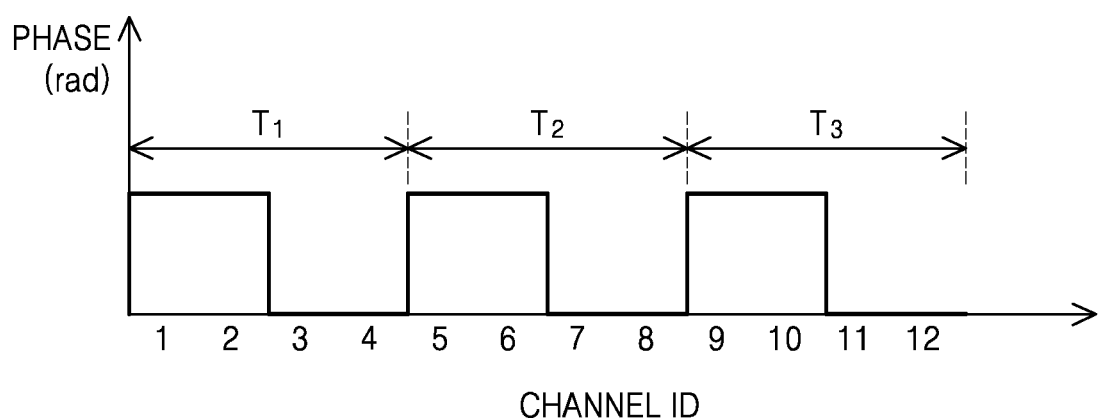
FIG. 8A is a graph showing a binary phase profile of a method of driving the phase modulation device according to an exemplary embodiment.
Figure 8B:
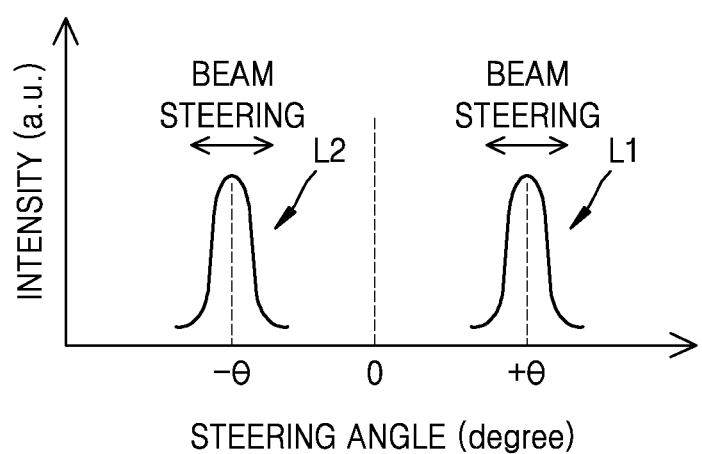
FIG. 8B is a graph showing first emitted light and second emitted light steered according to the binary phase profile of FIG. 8A.

FIG. 8A is a graph showing a binary phase profile in a method of driving the phase modulation device 500 according to an exemplary embodiment. FIG. 8B is a graph showing the first emitted light L1 and the second emitted light L2 steered according to the binary phase profile of FIG. 8A.

Referring to FIG. 8A, a binary phase profile is formed by setting cycles $T_k$ (k=1, 2, . . . ) in which an arrangement pattern of the first and second phase values φ1 and φ2 is repeated, by repeatedly performing a process of setting the first phase value φ1 for one or more adjacent channels $C_1$ through $C_N$ and setting the second phase value φ2 for one or more next adjacent channels $C_1$ through $C_N$ from among the plurality of channels $C_1$ through $C_N$ provided in the phase modulator 100. Desired optical performance may be adjusted by using an average value $<T_k>$ of the cycles.

A value of each of the cycles $T_k$ in which the arrangement pattern of the first and second phase values φ1 and φ2 is repeated may be a discrete value such as an integer multiple of a size of each channel, whereas the average value $<T_k>$ of the cycles $T_k$ may be a continuous value. Accordingly, since the average value $<T_k>$ is adjusted by differently adjusting the values of the cycles $T_k$ according to cycle orders, desired optical performance may be more easily adjusted than when the values of the cycles $T_k$ are set to the same value.

When the binary phase profile is applied to the plurality of channels $C_1$ through $C_N$ provided in the phase modulator 100, the first emitted light L1 and the second emitted light L2 may be located at two positions, that is, +θ and −θ, as shown in FIG. 8B. A peak intensity value of each of the first emitted light L1 and the second emitted light L2 may be less than a peak intensity value of the emitted light L' of FIG. 7B.

In a BPA method using the binary phase profile, in addition to a $0^{th}$ order beam L0 emitted at an angle that is the same as an angle at which the incident light L is incident on the phase modulation device 500, a $+1^{st}$ order beam, that is, the first emitted light L1, steered by an angle of +θ and a $-1^{st}$ order beam, that is, the second emitted light L2, steered by an angle of −θ may exist as shown in FIG. 2. The first emitted light L1 and the second emitted light L2 may be symmetric about the $0^{th}$ order beam L0 each with a steering angle of θ from the $0^{th}$ order beam. When a difference between the first and second phase values φ1 and φ2 is π, the generation of the $0^{th}$ order beam L0 may be prevented.

When the binary phase profile is used, the steering angle θ may be defined by Equation 2.

$$\sin\theta = \frac{\lambda}{<T_k>} \quad (2)$$

where λ is a wavelength of incident light, $T_k$ is a $k^{th}$ cycle in which an arrangement pattern of the first and second phase values φ1 and φ2 is repeated, and $<T_k>$ is an average value of cycles.

When the steering angle θ is adjusted according to Equation 2, since the average value $<T_k>$ that may be a continuous value may be adjusted by using only the first and second phase values φ1 and φ2, various steering angles 8 may be realized. Accordingly, scanning of a desired angle range may be easily performed. Also, sizes of the channels $C_1$ through $C_N$ and a driving method when the binary phase profile is used are respectively less and simpler than those when each of the channels $C_1$ through $C_N$ is formed to have a phase change ranging from 0 π to 2 π.

Figure 9:
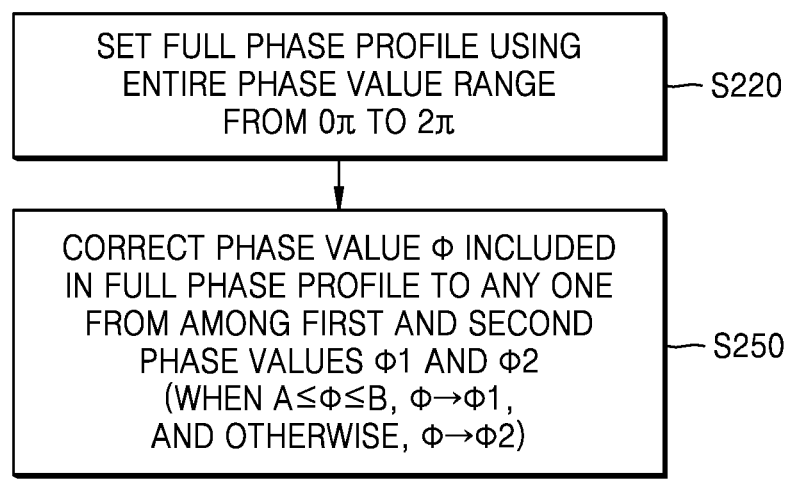
FIG. 9 is a flowchart for explaining a detailed operation of setting a binary phase profile in the method of FIG. 6.
Figure 10:
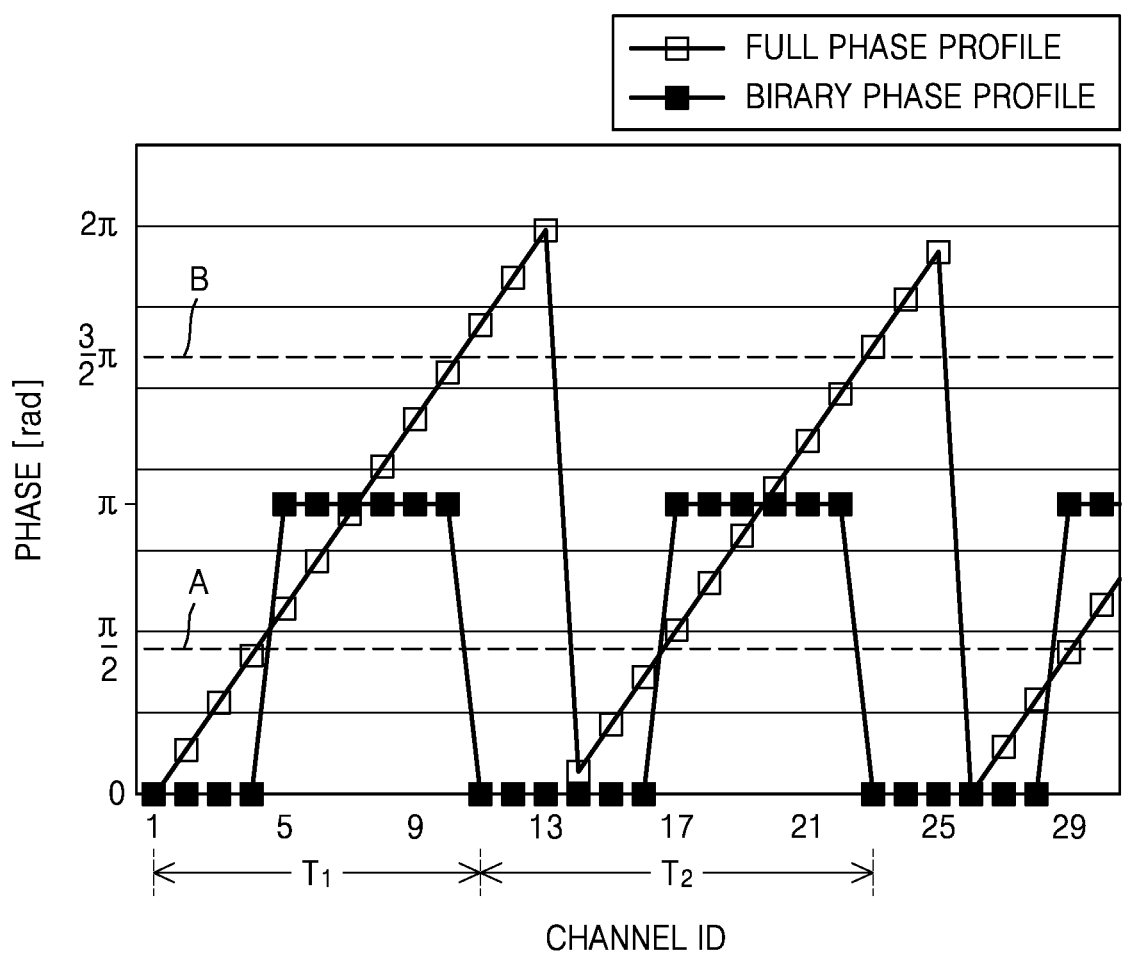
FIG. 10 is a graph illustrating an example in which a full phase profile is corrected to a binary phase profile according to a method of driving the phase modulation device according to an exemplary embodiment.

FIG. 9 is a flowchart for explaining a detailed operation of setting a binary phase profile in the method of FIG. 6. FIG. 10 is a graph illustrating an example where a full phase profile is corrected to a binary phase profile according to a method of driving the phase modulation device 500 according to an exemplary embodiment.

Referring to FIG. 9, in operation S220, in order to set a binary phase profile, a full phase profile may be set. The full phase profile may be a phase profile using an entire phase value range from 0 π to 2 π to achieve desired optical performance.

Next, in operation S250, each of phase values included in the full phase profile is corrected to any one from among the first and second phase values φ1 and φ2. For example, when a phase value φ in the full phase profile satisfies a continuous first range as shown in A≤φ≤B, the phase value may be corrected to φ1 and otherwise, the phase value φ may be corrected to φ2.

FIG. 10 illustrates an example where a full phase profile is corrected to a binary phase profile. In the graph, in order to correct the full phase profile to the binary phase profile, π/2 was applied to A, 3π/2 was applied to B, 0 was applied to φ1, and π was applied to φ2. That is, when a phase value included in the full phase profile is π/2≤φ≤3π/2, the phase value was corrected to π, and other phase values were corrected to 0. The above-described rule is exemplary, and other modified rules may be used to adjust the average value $<T_k>$ of cycles.

Referring back to FIG. 1, as described above, the phase modulation device 500 may light in a plurality of directions by modulating a phase of the incident light L by using a BPA method using a binary phase profile. The light emitted may include the first emitted light L1 and the second emitted light L2 steered by the angles of +θ and −θ from the $0^{th}$ order beam LA.

The first emitted light L1, from among the first emitted light L1 and the second emitted light L2 emitted from the phase modulation device 500, may be directly emitted to the object OBJ. The second emitted light L2 may be reflected by the beam reflection device 700 to the object OBJ. Accordingly, both the first emitted light L1 and the second emitted light L2 emitted from the phase modulation device 500 may be emitted to the object OBJ to perform scanning. In this case, a scan area of the first emitted light L1 and a scan area of the second emitted light L2 may be the same or different from each other by adjusting an angle (referred to as reflection angle) at which the second emitted light L2 is reflected by the beam reflection device 700 as described below. Alternatively, a scan area of the first emitted light L1 and a scan area of the second emitted light L2 may be located adjacent to each other.

Figure 11:
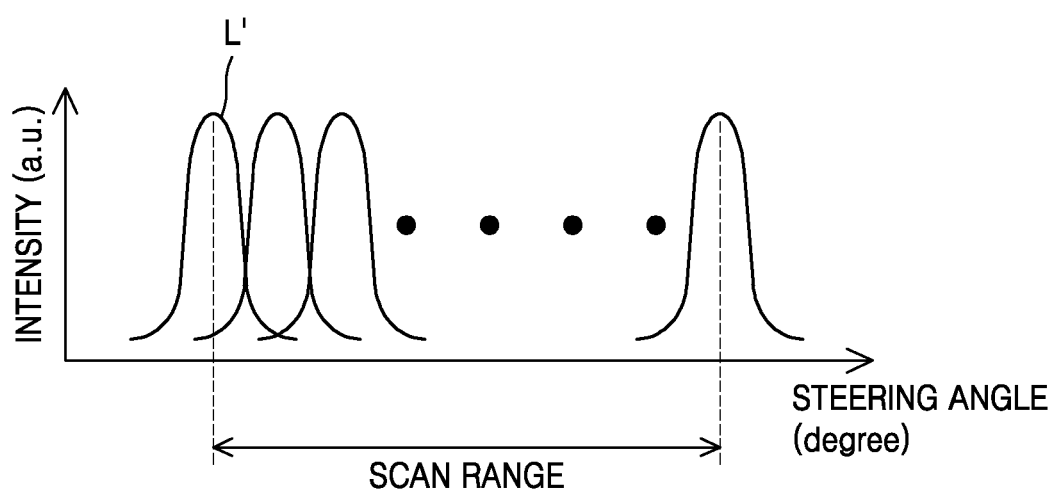
FIG. 11 is a graph showing a state in which emitted light generated according to an existing OPA method is steered to scan an object.

FIG. 11 is a graph showing a state in which emitted light L', generated according to an existing OPA method, is steered to scan an object. Referring to FIG. 11, the emitted light L' is scanned over the object within a predetermined scan range.

Figure 12A:
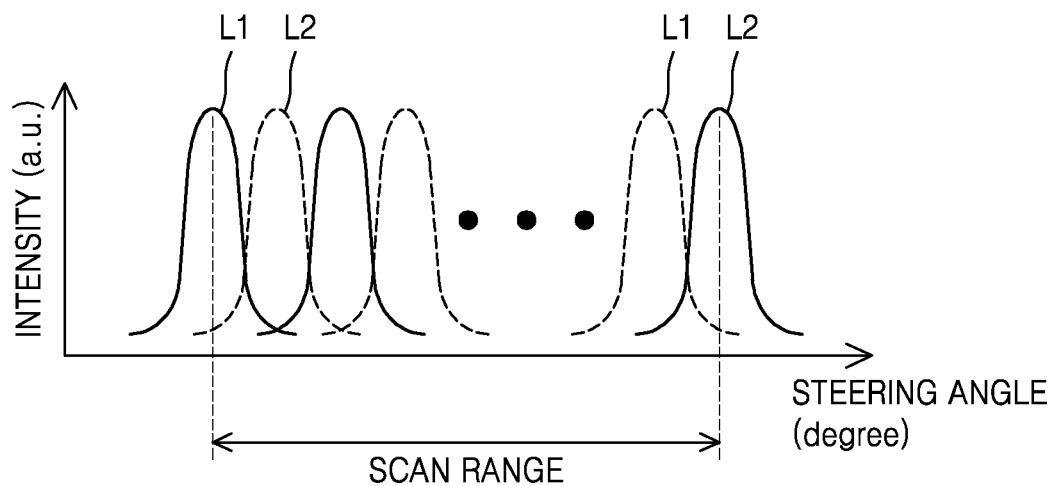
FIGS. 12A through 12C are graphs showing states in which the first emitted light and the second emitted light are steered by the beam steering apparatus of FIG. 1 to scan an object.
Figure 12B:
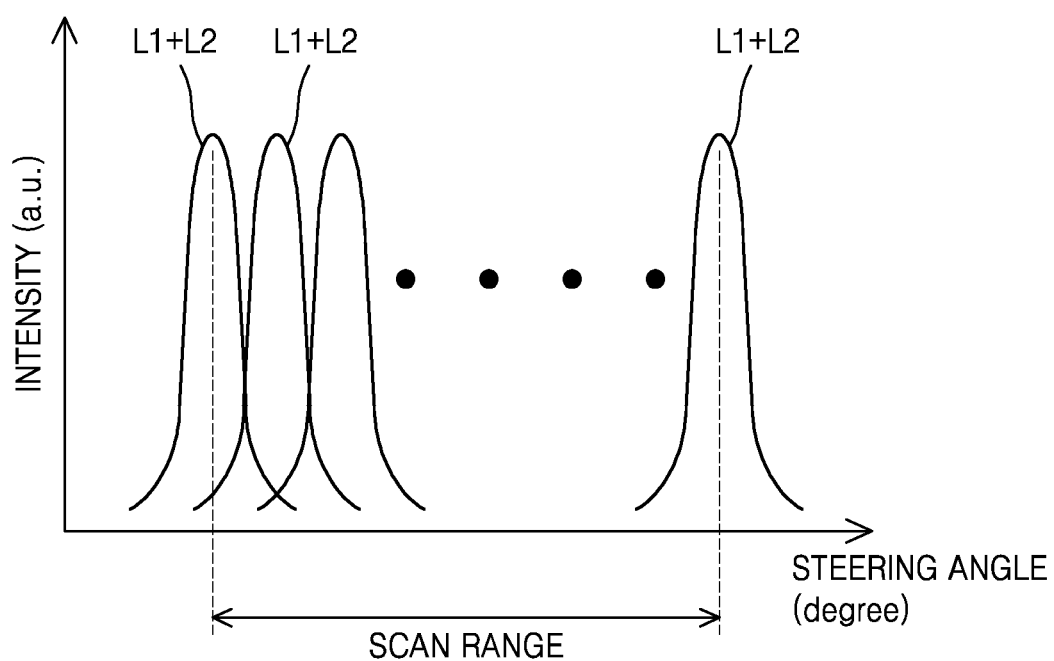
Figure 12C:
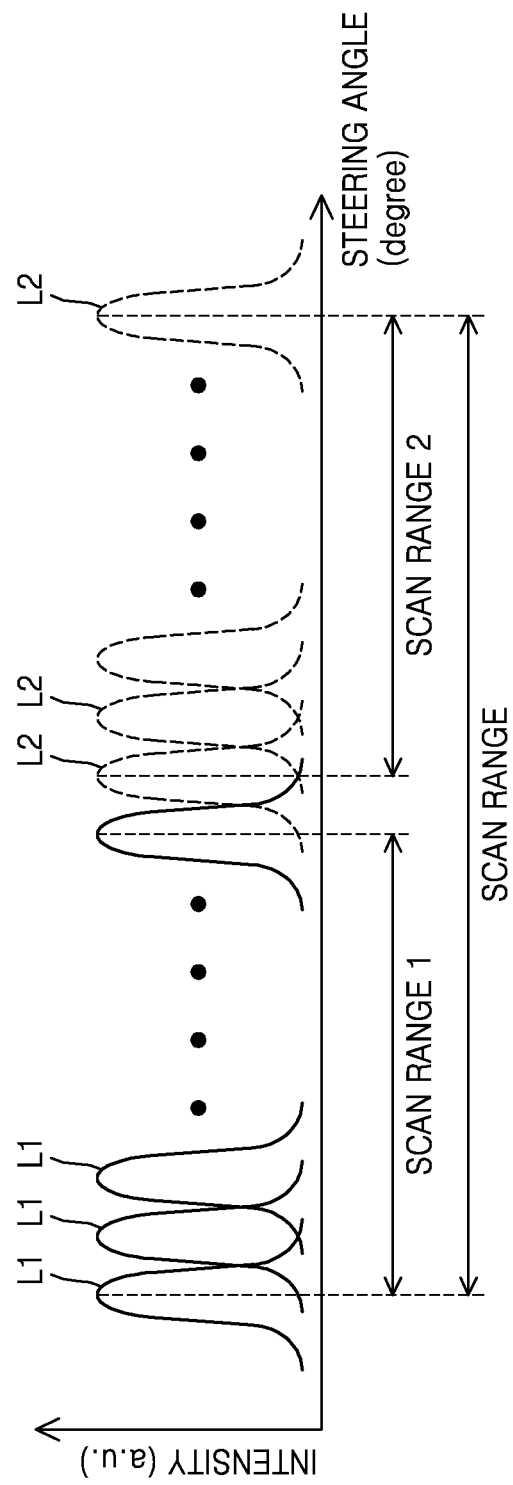

FIGS. 12A through 12C are graphs showing a state in which the first emitted light L1 and the second emitted light L2 are steered by the beam steering apparatus 1000 of FIG. 1 to scan an object.

FIG. 12A illustrates a state in which the first emitted light L1 and the second emitted light L2 are alternately scanned over the object. Referring to FIG. 12A, the first emitted light L1 and the second emitted light L2 may be alternately scanned over the object with a predetermined interval so that a scan area of the first emitted light L1 and a scan area of the second emitted light L2 are the same by adjusting a reflection angle of the second emitted light L2 by using the beam reflection device 700. Accordingly, when a scan range of the first emitted light L1 and the second emitted light L2 is the same as the scan range of FIG. 11, an angular resolution may be the same and a scan speed may be twice greater than that in FIG. 11.

FIG. 12B illustrates a state in which the first emitted light L1 and the second emitted light L2 are scanned over the object by overlapping each other. Referring to FIG. 12B, the first emitted light L1 and the second emitted light L2 may be scanned over the object by overlapping each other so that a scan area of the first emitted light L1 and a scan area of the second emitted light L2 are the same by adjusting a reflection angle of the second emitted light L2 by using the beam reflection device 700. Accordingly, when a scan range of the first emitted light L1 and the second emitted light L2 is the same as the scan range of FIG. 12A, the object may be scanned with light having greater power.

FIG. 12C illustrates a state in which scan areas of the first emitted light L1 and the second emitted light L2 are different from each other. Referring to FIG. 12C, a scan area of the first emitted light L1 and a scan area of the second emitted light L2 may be located adjacent to each other by adjusting a reflection angle of the second emitted light L2 by using the beam reflection device 700. Accordingly, since a scan range obtained by summing a first scan range of the first emitted light L1 and a second scan range of the second emitted light L2 is about twice greater than the scan range of FIG. 12B, a wider image may be obtained.

Figure 13:
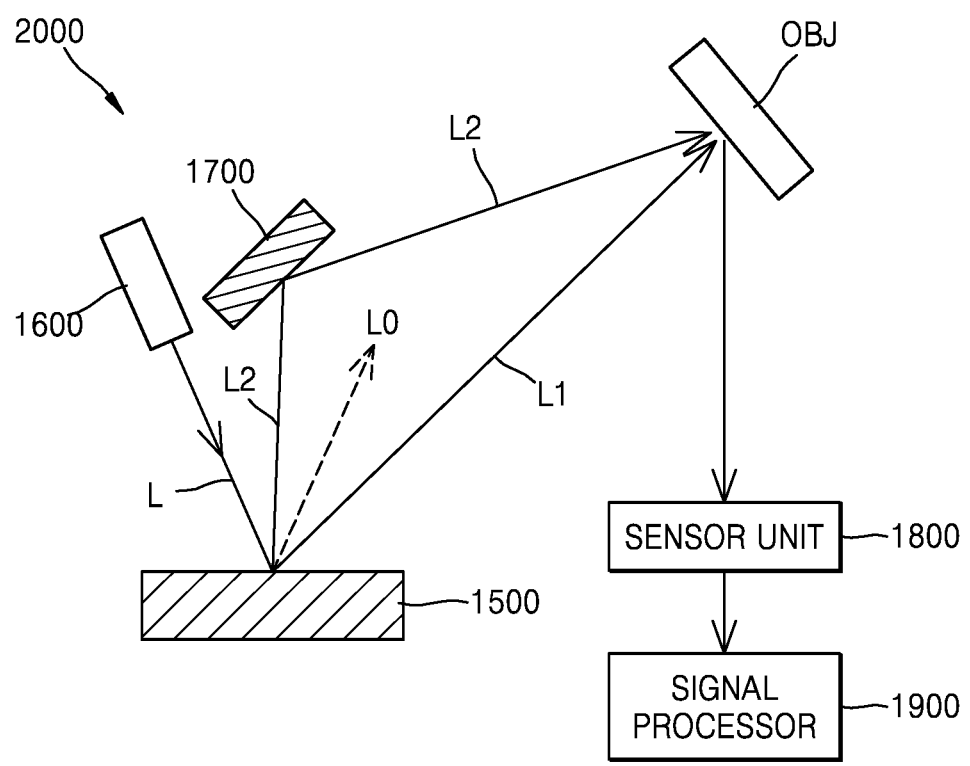
FIG. 13 is a view of a light detection and ranging (LiDAR) system according to another exemplary embodiment.

FIG. 13 is a view of a light detection and ranging (LiDAR) system 2000 according to another exemplary embodiment.

Referring to FIG. 13, the LiDAR system 2000 may include a light source 1600 configured to emit light, a beam steering apparatus configured to steer incident light L from the light source 1600 to the object OBJ, and a sensor unit 1800 configured to receive light reflected from the object OBJ.

The light source 1600 may emit light having a wavelength band suitable to analyze a position and a shape of the object OBJ. Examples of the light source 1600 may include, but are not limited to, an LD, an LED, and an SLD for emitting light having an infrared wavelength. Also, the light source 1600 may emit pulsed light or continuous light.

The beam steering apparatus may include a phase modulation device 1500 configured to modulate a phase of the incident light L and emit light in different directions, e.g., first emitted light L1 and second emitted light L2, and a beam reflection device 1700 configured to reflect at least one (e.g., L2) of the first emitted light L1 and the second emitted light L2, to the object OBJ. The phase modulation device 1500 modulates a phase of the incident light L emitted from the light source 1600 and steers the emitted light, that is, the first emitted light L1 and the second emitted light L2. The phase modulation device 1500 that is driven by using a BPA method to steer the emitted light, i.e., the first emitted light L1 and the second emitted light L2 as described above, may include a phase modulator including a plurality of channels configured to modulate a phase of the incident light L, a signal input unit configured to apply an input signal for phase modulation to each of the plurality of channels, a binary setter configured to set a binary phase profile using two phase values, and a controller configured to control the signal input unit according to the binary phase profile. The phase modulation device 1500 and a method of driving the phase modulation device 1500 have been described above in detail.

The first emitted light L1, from among the first emitted light L1 and the second emitted light L2 emitted from the phase modulation device 1500, may be directly emitted to the object OBJ. The second emitted light L2 may be reflected, by the beam reflection device 1700, to the object OBJ. Accordingly, both the first emitted light L1 and the second emitted light L2 emitted from the phase modulation device 1500 may be incident on the object OBJ to perform scanning. In this case, a scan area of the first emitted light L1 and a scan area of the second emitted light L2 may be made to be the same or to be adjacent to each other by adjusting a reflection angle of the second emitted light L2 by using the beam reflection device 1700.

An optical signal, sensed by the sensor unit 1800 while the beam steering apparatus scans the object OBJ, may be used to analyze the existence, a position, and a shape of the object OBJ. The sensor unit 1800 may include an array of sensors for sensing light reflected from the object OBJ. The sensor unit 1800 may include an array of sensors for sensing light having different wavelengths.

The LiDAR system 2000 may further include a signal processor 1900. The signal processor 1900 may perform a predetermined calculation, for example, a calculation for measuring a time of flight of an optical signal detected by the sensor unit 1800 and may determine a three-dimensional (3D) shape of the object OBJ. The signal processor 1900 may use any of various calculation methods. For example, a direct time measurement method involves obtaining a distance by measuring a time interval between the projection of pulsed light to the object OBJ and the arrival of light reflected from the object OBJ by using a timer. A correlation method involves projecting pulsed light to the object OBJ and measuring distance based on a brightness of light reflected from the object OBJ. A phase delay measurement method involves projecting continuous wave light such as sine wave light onto the object OBJ, detecting a phase difference of light reflected from the object OBJ, and converting the phase difference into a distance. The signal processor 1900 may include a memory in which a program and other data needed for the calculation are stored.

The signal processor 1900 may transmit a result of the calculation, that is, information about a shape and a position of the object OBJ, to another unit. For example, the information may be transmitted to a warning system or a driving controller of an autonomous driving apparatus including the LiDAR system 2000.

Since the LiDAR system 2000 may be used as a sensor for obtaining 3D information about an object in real time, the LiDAR system 200 may be used in an autonomous driving apparatus, for example, a driverless car, an autonomous vehicle, a robot, or a drone. Also, the LiDAR system 200 may be used in a black box as well, as the autonomous driving apparatus, to determine front and rear obstacles at night when it is difficult to identify objects by using only an image sensor.

According to the above exemplary embodiments, since a binary phase profile using only two phase values is set and a phase modulation device is driven according to the binary phase profile, beam steering may be easily performed, the size of a device need not be increased, as for use with a big phase change, a driving signal having a high precision may not be needed, and a phase limitation may be overcome by using a simple system. Also, since light emitted from the phase modulation device and proceeding along different paths is scanned over an object by using a beam reflection device, a scan speed may be increased or a wide image may be obtained due to a wide scan range.

While one or more exemplary embodiments have been described with reference to the figures, it will be understood by those of ordinary skill in the art that various changes in form and details may be made therein without departing from the spirit and scope as defined by the following claims.

What is claimed is:

1. A beam steering apparatus comprising:
a phase modulation device configured to modulate a phase of incident light and thereby reflect the incident light in at least two different directions, the incident light reflected in the at least two different directions comprising a first steered light that is reflected in a first direction and a second steered light that is reflected in a second direction; and
a beam reflection device configured to reflect, toward an object, one of the first steered light and the second steered light,
wherein the phase modulation device is further configured to apply a first phase value $\varphi 1$ and a second phase value $\varphi 2$ to the incident light, and thereby emit the first steered light from the phase modulation device toward the object in the first direction and emit the second steered light from the phase modulation device toward the beam reflection device in the second direction so that the second steered light travels to the object after being reflected from the beam reflection device,
wherein the first steered light is a $+1^{st}$ order diffracted beam of the incident light and the second steered light is a $-1^{st}$ order diffracted beam of the incident light, and
wherein the beam reflection device is configured to control a reflection angle of the second steered light and thereby cause a scan area of the first steered light and a scan area of the second steered light to be the same.

2. The beam steering apparatus of claim 1, wherein the phase modulation device comprises:
a phase modulator comprising a plurality of channels;
a signal input unit configured to apply an input signal for phase modulation to each of the plurality of channels;
a binary setter configured to set a binary phase profile by arranging the first phase value $\varphi 1$ and the second phase value $\varphi 2$ among the plurality of channels; and
a controller configured to control the signal input unit according to the binary phase profile.

3. The beam steering apparatus of claim 2, wherein the binary setter is further configured to repeatedly perform a process of setting the first phase value $\varphi 1$ for one or more first adjacent channels of the plurality of channels and setting the second phase value $\varphi 2$ for one or more second adjacent channels of the plurality of channels.

4. The beam steering apparatus of claim 3, wherein the binary setter is configured to control the phase modulator to steer the incident light to form the first steered light and the second steered light by an angle $\theta$ according to $$\sin \theta = \frac{\lambda}{<T_k>}$$

where $\lambda$ is a wavelength of the incident light, $T_k$ is a $k^{th}$ cycle in which an arrangement pattern of the first phase value $\varphi 1$ and the second phase value $\varphi 2$ is repeated, and $<T_k>$ is an average value of the cycles.

5. The beam steering apparatus of claim 4, wherein the binary setter is further configured to set a full phase profile using an entire phase value range from $0 \pi$ to $2 \pi$ and to correct each phase value constituting the full phase profile to one of the first phase value $\varphi 1$ and the second phase value $\varphi 2$.

6. The beam steering apparatus of claim 5, wherein the binary setter is further configured to correct each of the phase values constituting the full phase profile to one of the first phase value $\varphi 1$ and the second phase value $\varphi 2$ by correcting all phase values within a set range to the first phase value $\varphi 1$ and correcting all phase values outside the set range to the second phase value $\varphi 2$.

7. The beam steering apparatus of claim 6, wherein a difference between the first phase value $\varphi 1$ and the second phase value $\varphi 2$ is $\pi$, and a width of the set range is $\pi$.

8. A method of driving a beam steering apparatus comprising a phase modulation device and a beam reflection device, the method comprising:
selecting a first phase value $\varphi 1$ and a second phase value $\varphi 2$ as phase values for a plurality of channels of the phase modulation device;
setting a binary phase profile in the phase modulation device by assigning one of the first phase value $\varphi 1$ and the second phase value $\varphi 2$ to each of the plurality of channels;
applying the first phase value $\varphi 1$ and the second phase value $\varphi 2$ to an incident light that is incident onto the phase modulation device to steer the incident light in at least two different directions, the incident light steered in at least two different directions comprising a first steered light that is steered in a first direction and a second steered light that is steered in a second direction; and
emitting the first steered light from the phase modulation device toward an object in the first direction, and emitting the second steered light from the phase modulation device toward the beam reflection device in the second direction so that the second steered light travels to the object after being reflected from the beam reflection device, by driving the phase modulation device according to the set binary phase profile; and controlling a reflection angle of the second steered light, thereby causing a scan area of the second steered light to be the same as a scan area of the first steered light, and wherein the first steered light is a +1$^{st}$ order diffracted beam of the incident light and the second steered light is a −1$^{st}$ order diffracted beam of the incident light.

9. The method of claim 8, further comprising controlling the beam steering apparatus such that the first steered light and the second steered light are scanned over the object by simultaneously overlapping each other or are alternately overlapping each other.

10. The method of claim 8, wherein the setting of the binary phase profile comprises repeatedly setting the first phase value φ1 for one or more first adjacent channels of the plurality of channels and setting the second phase value φ2 for one or more second adjacent channels of the plurality of channels.

11. The method of claim 10, wherein the setting of the binary phase profile comprises controlling a phase modulator to steer the first steered light and the second steered light by an angle θ according to $$\sin \theta = \frac{\lambda}{<T_k>}$$

where λ is a wavelength of the incident light, $T_k$ is a k$^{th}$ cycle in which an arrangement pattern of the first phase value φ1 and the second phase value φ2 is repeated, and $<T_k>$ is an average value of the cycles.

12. The method of claim 11, wherein the setting of the binary phase profile further comprises:

setting a full phase profile using an entire phase value range from 0 π to 2 π; and correcting each phase value constituting the full phase profile to one of the first phase value φ1 and the second phase value φ2.

13. The method of claim 12, wherein the setting of the binary phase profile further comprises correcting each of the phase values constituting the full phase profile to one of the first phase value φ1 and the second phase value φ2 by correcting all phase values within a set range to the first phase value φ1 and correcting all phase values outside the set range to the second phase value φ2.

14. The method of claim 13, wherein a difference between the first phase value φ1 and the second phase value φ2 is π and a width of the set range is π.

15. A light detection and ranging (LiDAR) system comprising:

a light source;

a beam steering apparatus configured to steer light from the light source to an object, the beam steering apparatus comprising:

a phase modulation device configured to modulate a phase of incident light and thereby reflect the incident light in at least two different directions, the incident light reflected in the at least two different directions comprising a first steered light that is reflected in a first direction and a second steered light that is reflected in a second direction, and a beam reflection device configured to reflect, toward the object, one of the first steered light and the second steered light; and a sensor unit configured to receive light reflected from the object, wherein the phase modulation device is further configured to apply a first phase value φ1 and a second phase value φ2 to the incident light, and thereby emit the first steered light from the phase modulation device toward the object in the first direction and emit the second steered light from the phase modulation device toward the beam reflection device in the second direction so that the second steered light travels to the object after being reflected from the beam reflection device, wherein the first steered light is a +1$^{st}$ order diffracted beam of the incident light and the second steered light is a −1$^{st}$ order diffracted beam of the incident light, and wherein the beam reflection device is configured to control a reflection angle of the second steered light and thereby cause a scan area of the first steered light and a scan area of the second steered light to be the same.

16. A beam steering method comprising:

driving a phase modulation device according to a binary phase profile, such that each of a plurality of channels is assigned one of a first phase value and a second phase value;

applying the first phase value and the second phase value to an incident light that is incident onto the phase modulation device to steer the incident light in at least two different directions, the incident light steered in at least two different directions comprising a first steered light that is steered in a first direction and a second steered light that is steered in a second direction;

emitting the first steered light from the phase modulation device toward an object in the first direction, and emitting the second steered light from the phase modulation device toward a beam reflection device in the second direction so that the second steered light travels to the object after being reflected from the beam reflection device, by driving the phase modulation device according to the binary phase profile; and controlling a reflection angle of the second steered light, thereby causing a scan area of the second steered light to be the same as a scan area of the first steered light, wherein the first steered light is a +1$^{st}$ order diffracted beam of the incident light and the second steered light is a −1$^{st}$ order diffracted beam of the incident light.

* * * * *